United States Patent Office 2,891,821
Patented June 23, 1959

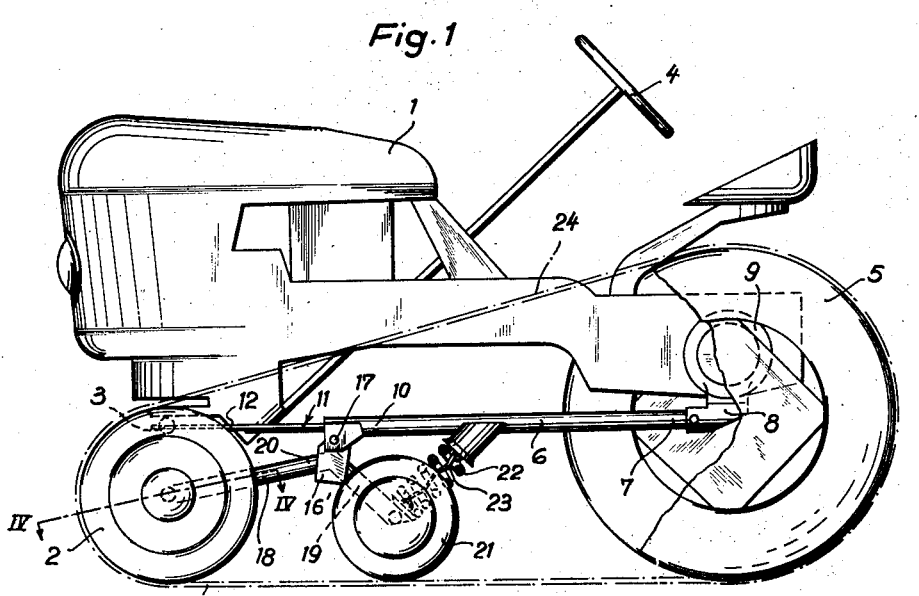
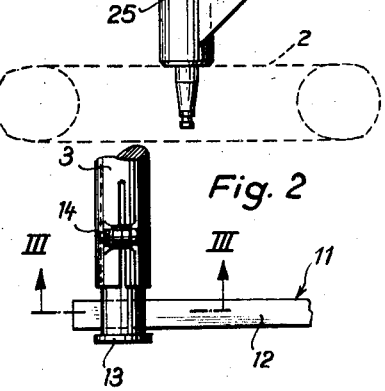
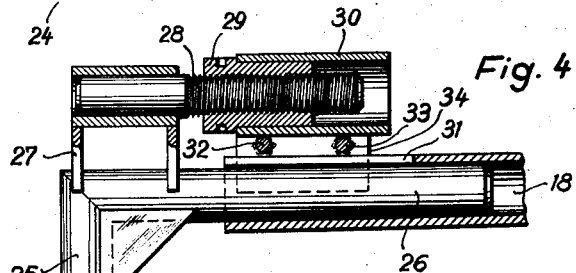
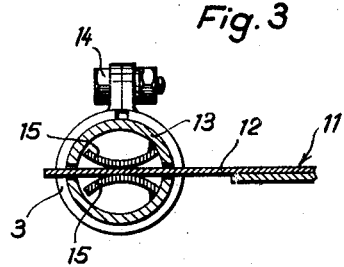
INVENTOR
Otmar Mayr

2,891,821

TRACTION ATTACHMENT FOR WHEELED TRACTORS

Otmar Mayr, Plochingen (Neckar), Germany, assignor to Dr. Ing. h.c.F. Porsche K.-G., Stuttgart-Zuffenhausen, Germany Application November 18, 1957, Serial No. 697,176

Claims priority, application Germany December 5, 1956

9 Claims. (Cl. 305—3)

The present invention relates to a device for transforming a wheeled tractor into a full-track vehicle.

Suggestions for transforming a wheeled tractor into a full-track vehicle have already been made, either by exchanging the driving (rear) wheels for a so-called attaching endless track or by covering the wheels with a chain. The wheeled tractor is then provided with a supporting wheel which is mounted on the frame of the tractor so that it can be vertically adjusted and which serves as a deflecting roller for a chain extending over the driven rear wheel. It is thus a half-track by which an improvement of the road traction and a reduction of the ground pressure is achieved. Such a rebuilt wheeled tractor, however, cannot replace a full track, that is, a vehicle which moves exclusively by means of chains, particularly in forests and difficult terrain.

On the other hand, there is a need in wooded regions for a vehicle which is useful not only for the ordinary agricultural operations and road transportation but also for the forestry operations which are mostly done in winter, since the purchase of a separate full-track vehicle for these forest operations, which only last a few weeks, is too expensive and uneconomical.

In view of the foregoing, the primary object of the invention is, therefore, to provide a device or an attachment for transforming a wheeled tractor into a full-track vehicle. The device for this purpose, according to the invention, consists of one supporting outrigger for each side of the vehicle for hinged support on the rear axle and for support by means of a leaf spring on the front axle of the vehicle, and a rocker on each outrigger, in the form of a bell crank lever, the fulcrum of which is pivoted to the outrigger, at one end of which is mounted a supporting wheel and at the other end of which can be attached the front wheel of the wheeled tractor. A chain or track is provided over the wheels on each side of the vehicle. A complete exchange unit is thus provided, the attachment of which to the wheeled tractor does not require any technical knowledge. The transformation can be effected on the spot. The wheeled tractor has no superstructures fixed to the vehicle which might impair the vision of the driver in farm work or the possibility of attaching the devices. The leaf spring by which the supporting outrigger bears on the front axle forms an extension of the supporting outrigger and is held to the front axle by a member of tubular cross section as a supporting piece to be inserted in the front axle. This results in a simple but efficient guide for the leaf spring. The leaf spring is mounted between two opposite spherical shaped bearing sections so that it can move lengthwise in the supporting piece. The rocker bears on the supporting outrigger by means of a helical spring engaging the arm of the rocker carrying the supporting wheel. The arm of the rocker carrying the front wheel of the vehicle is axially adjustable to regulate the chain tension.

An embodiment of the invention is represented in the attached drawing by way of an example.

Fig. 1 is a side view of a wheeled tractor provided with a full-track attachment according to the invention;

Fig. 2 is a broken view showing a detail of the attachment on an enlarged scale;

Fig. 3 is a sectional view taken on the line III—III of Fig. 2; and

Fig. 4 is a broken top view partly in section taken on the line IV—IV of Fig. 1 and drawn on an enlarged scale of the front wheel mounting portion of the attachment and the chain tensioning means.

The tractor 1, which is to be used as a wheeled tractor for road transportation and farm work as well as a full-track vehicle for forest operations, is provided as a wheeled tractor in a known manner with front steering wheels 2 which are mounted on a front axle 3 in a known manner not shown, and which can be steered by means of the steering wheel 4. The tractor includes rear wheels 5 driven by an engine, provided, for example, in the front of the vehicle, from a transmission arranged in the region of the rear axle.

The device for transforming the wheeled tractor into a full-track vehicle comprises a supporting outrigger 6 which is articulated at one end 7 in a bracket 8. Into the other end 10 of the outrigger is clamped a leaf spring 11, the free end 12 of which is supported in a supporting piece 13, in the manner shown in Figs. 2 and 3. In this supporting piece 13 the leaf spring 11 is guided between the arcuate surfaces of two half shells 15 attached to the piece 13 and extending on opposite sides of the spring as in Fig. 3. In the region where the leaf spring is clamped in the end 10 of the supporting outrigger 6, a bracket 16 is provided in which a rocker 20, in the form of a bell crank lever, is secured and suspended having two arms 18, 19. The rocker 20 is swingable on a pivot bolt 17 extending through bracket 16 and bracket plates attached to the outrigger 6. On the end of the arm 18, pointing in the direction of travel of the vehicle, is arranged a track wheel, i.e. the front wheel 2 of the wheeled tractor, and on the end of the arm 19, pointing in the opposite direction, is arranged an additional supporting wheel 21. This arm 19 bears on the outrigger 6 by means of a helical compression spring 22, and a strap 23 is provided to limit the stroke of the spring and the downward movement.

In order to secure the device on the tractor, the steering wheels 2 of the wheeled tractor with their guide members are detached from the front axle 3 and the steering rods are detached, and one outrigger unit each is attached at both sides of the vehicle. The steering wheels 2 are removed from their guide members and secured respectively on the forward ends of the arms 18 of the outrigger unit pointing in the direction of travel at both sides of the vehicle. The forward end of each arm 18 includes a device as shown in Fig. 4. The bracket 8 is attached on a correspondingly designed supporting surface of the axle support 9 carrying the rear wheel 5, and the supporting piece 13 is inserted in the tubular front axle 3 and tightened in place by means of a bolt 14, as shown in Figs. 2 and 3.

An endless chain 24, which is made of rubber or metal links, is put over the front wheel 2 and the rear wheel 5, at each side of the vehicle, and the chain is tensioned by the supporting wheel 21 which bears on the lower run of the chain. The front end of the converted full track vehicle is supported on the leaf springs 11 which in turn are supported by the wheels 2 and 21 at the respective sides of the vehicle.

The chain tension is regulated and adjusted by a device which is provided on the front arm 18 of the rocker 20, as shown in Fig. 4. The forward end of this arm 18 is comprised of the part 25, carrying the front wheel 2, extending inwardly from the wheel 2 where it is bent to provide a portion 26 bent from the part 25 and extending rearwardly into the tubular arm 18. The portion 26 protruding from the arm 18 is provided with a bracket 27 in which a threaded bolt 28 is secured which is provided with an adjusting nut 29. This adjusting nut in turn is guided in a sleeve assembly 30 arranged on the forward end of the tubular arm 18. The nut 29 is provided with a shoulder bearing against the forward end of the sleeve. By tightening or loosening the nut 29, the wheel base, that is, the distance between the front wheel 2 and the rear wheel 5, is made shorter or longer so that the tension of the endless track or chain is regulated at the same time.

In order to prevent an accidental change of the wheel base, the tubular arm 18 is provided with an oblong slot 31 so that when the bolts 32, 33 are tightened, the bent-off end 26 of the part 25 is locked. The assembly 30 includes two mounting plates 34 secured respectively on opposite sides of the tubular arm 18 and through which the clamping bolts 32 and 33 extend.

The steering of the wheel tractor, thus transformed into a full-track vehicle, is effected by means of a steering differential provided in the gear box, after the front wheels 2, which are designed in the wheel tractor as steered wheels, have each been fixed during the transformation on a part 25 of the front arm 18 of the rocker 20, on the respective sides of the vehicle, to provide a full-track vehicle.

What I claim is:

1. A full-track attachment for transforming a wheeled tractor having front wheels and rear driving wheels into a full-track vehicle, comprising an outrigger unit for each side of the tractor including an elongated supporting member for mounting lengthwise of the tractor, means for mounting one end of the elongated supporting member on the rear axle of the tractor, means for mounting the opposite end of the elongated supporting member at the forward end of the tractor, a two-armed rocker in the form of a bell crank lever pivoted at its fulcrum to said rigid supporting member intermediate the ends of said member with one arm of the rocker extending downwardly and forwardly and the other arm extending downwardly and rearwardly, means on the forward end of the forwardly-extending arm for mounting a front wheel of the tractor, a supplemental wheel mounted on the extending end of the rearwardly-extending arm, and a full track chain for extending around the front wheel when mounted on said forwardly-extending arm and a rear wheel with its lower run extending under and for engagement by said supplemental wheel.

2. A full-track attachment as claimed in claim 1, in which the forward end portion of the elongated supporting member comprises a leaf spring, and a compression spring mounted between the extending end portion of the rearwardly-extending arm of the rocker and the elongated supporting member for biasing the supplemental wheel against the lower run of the full-track chain.

3. A full-track attachment as claimed in claim 1, in which the means for mounting a front wheel of the tractor on the forward end of the forwardly-extending arm of the rocker includes means for adjusting the effective length of said arm to regulate the tension of the track chain.

4. A full-track attachment for wheeled tractors having front and rear axles, front wheels and rear driving wheels, a supporting outrigger unit for each side of the tractor including an elongated rigid supporting member extending lengthwise of the tractor, means for supporting one end of the rigid supporting member on the rear axle of the tractor, a leaf spring secured to the opposite end of the supporting member and attached to the front axle of the tractor, a two-armed rocker in the form of a bell crank lever the fulcrum of which is pivoted to the forward end portion of said supporting member with one arm of the rocker extending downwardly and forwardly and the other arm extending downwardly and rearwardly, means for mounting a front wheel of the tractor on the forward end of the forwardly-extending arm, a supplemental wheel mounted on the extending end of the rearwardly-extending arm in line with the front and rear wheels when the front wheel is mounted on said forwardly-extending arm, and a full-track chain extending around the front and rear wheels with its lower run extending under and being engaged by said supplemental wheel.

5. An attachment as claimed in claim 4, in which the forwardly-extending arm is tubular, and the front wheel mounting means includes a rearwardly-projecting portion extending into the forward end of said tubular arm, and means for clamping the tubular arm to said rearwardly-projecting portion.

6. An attachment as claimed in claim 4, including a compression spring mounted between the elongated rigid supporting member and the end portion of the arm carrying the supplemental wheel for biasing the supplemental wheel down against the lower run of the full-track chain.

7. A full-track vehicle comprising a transformation of a wheeled tractor having front and rear axles, front wheels and rear driving wheels respectively mounted on the front and rear axles, the vehicle including the wheeled tractor provided with a supporting outrigger unit at each side, each unit including an elongated rigid supporting member extending lengthwise of the tractor, means for mounting one end of the rigid supporting member on the rear axle of the tractor, a leaf spring one end of which is secured to the opposite end of the elongated supporting member while the other end is attached to the front axle of the tractor, a two-armed rocker in the form of a bell crank lever the fulcrum of which is pivoted to the forward end portion of said rigid supporting member with one arm of the rocker extending downwardly and forwardly and the other arm extending downwardly and rearwardly, a front wheel of the tractor being mounted on the forward end portion of the forwardly-extending arm, a supplemental wheel mounted on the extending end of the rearwardly-extending arm in line with the mounted front wheel and the rear wheel of the tractor, and a full-track chain extending around the mounted front wheel and the rear wheel with its lower run extending under and being engaged by said supplemental wheel, whereby a full-track vehicle is provided.

8. A full-track vehicle as claimed in claim 7, in which the front axle of the tractor is tubular, and a supporting member inserted in the end of the tubular axle and to which the forward end of the leaf spring is attached.

9. A full-track vehicle as claimed in claim 8, in which said supporting member is tubular and contains two spherical bearing sections arranged back-to-back between which the forward end portion of the leaf spring extends and is mounted for lengthwise movement.

References Cited in the file of this patent

UNITED STATES PATENTS

| 1,256,744 | Tolsma | Feb. 19, 1918 |
| 1,558,432 | Wilson | Oct. 20, 1925 |
| 1,558,816 | King | Oct. 27, 1925 |
| 1,599,710 | Goldstein | Sept. 14, 1926 |
| 2,423,544 | Acton | July 8, 1947 |
| 2,467,947 | Skelton | Apr. 19, 1949 |

FOREIGN PATENTS

| 42,503 | Denmark | June 30, 1930 |
| 1,030,204 | France | Mar. 11, 1953 |